Figure 1:
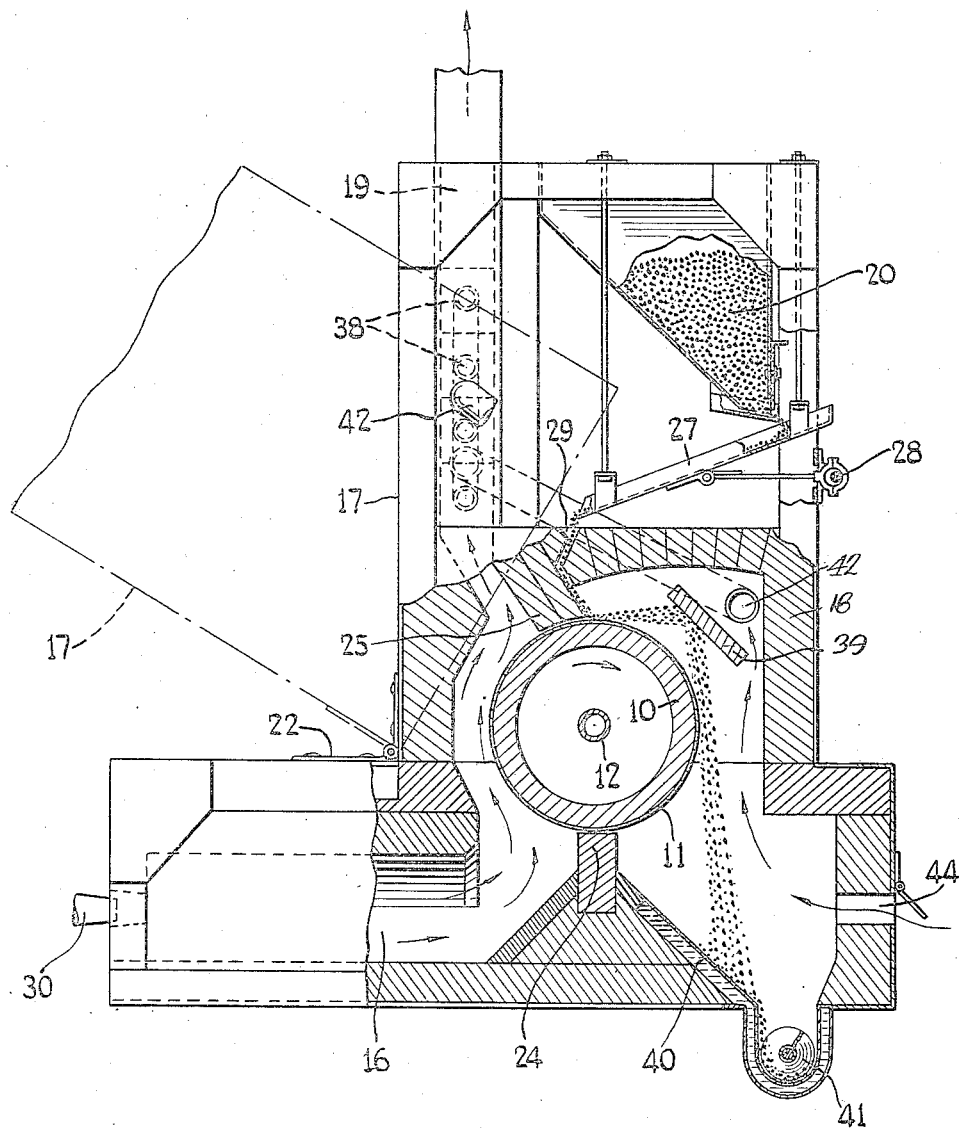

May 5, 1936.  C. Q. PAYNE  2,039,833

METHOD AND APPARATUS FOR ROASTING AND HEAT TREATING ORES AND MINERALS

Filed Aug. 22, 1935  2 Sheets-Sheet 2

Fig. 2.

Fig. 3.

INVENTOR
CLARENCE Q. PAYNE
BY
Hammond
ATTORNEYS

Patented May 5, 1936

2,039,833

UNITED STATES PATENT OFFICE 2,039,833

METHOD AND APPARATUS FOR ROASTING AND HEAT TREATING ORES AND MINERALS

Clarence Q. Payne, Shippan Point, Stamford, Conn.

Application August 22, 1935, Serial No. 37,278

10 Claims. (Cl. 75—7)

This invention relates to a novel method and apparatus for roasting ores and minerals out of contact with furnace gases, and in securing a greater range of heat control in the roasting operation than has heretofore been obtainable.

This invention is especially concerned with the roasting of ore particles by contact with a heat interchanger, while in a state of rapid motion, and practically out of contact with each other. It is therefore especially applicable to ores and minerals in a fine state of division, or after fine crushing. It consists essentially in imparting a regulated amount of heat to a refractory surface, or hearth, which moves in a closed circuit and in feeding the ore upon a preheated part of the surface when moved to a position where it is shielded from contact with the products of combustion.

A further feature of the invention is the control of the end stage of the roasting operation, as well as the degree of heat imparted, whereby an ore may be given a magnetizing roast, a dead roast, or an explosion roast depending upon the relative amount of heat imparted to it and upon the point at which oxidation is arrested by chilling and discharging it into a neutral atmosphere.

The invention may also be applied to the rapid drying of various minerals. Certain minerals may also be calcined, and by the addition of suitable reagents the apparatus embodying the invention may be employed for a chloridizing and a reducing roast of various ores.

In the accompanying drawings of one form of embodiment of my invention—

Figure 1 is a side elevation of the furnace partly in section to illustrate its operating features, Fig. 2 is a top plan view on a smaller scale, of my improved furnace with accessories, and Fig. 3 is an end elevation of my improved furnace.

Standard methods of roasting ores and other materials comprise at present: Surface roasting by rabbling, or by revolving in a cylinder furnace; blast roasting, or sintering; and flash, or self-ignition roasting. In these methods the atmospheric oxygen which is added, either for combustion of the fuel or for burning the sulphur of the ore in an exothermic reaction, is brought into direct contact with the material which is being roasted. Furthermore, roasting has heretofore been limited to the temperatures dependent upon that of the burning fuel either in direct contact with the ores to be roasted or sintered or through a muffle wall.

In my new method on the other hand, ores and minerals are acted on mainly by heat interchange with a moving hearth and the products of combustion of the fuel are kept out of contact with them during the roasting operation. In this process a thin sheet of finely divided material is heat treated while moving at so high a speed that the individual particles composing the feed sheet can be independently acted on. For this purpose a separate source of heat derived from oil, powdered fuel, etc., is employed, and the temperature is controlled within a wide range, namely that both above and below the ignition point of sulphur in pyrites and other sulphides, etc., with which roasting operations are largely concerned.

The temperature range which I obtain includes that from the ignition of fine iron pyrites at about 800°, i. e., a dull red heat, to a white heat of about 2600° F. which is about the temperature of perfect combustion of gas derived from fuel oil. By preheating the air-blast for an oil burner the latter temperature can be raised still more, viz: to about 3000° F. It is with this wide temperature range that my new method of roasting is chiefly concerned. I can thereby obtain a magnetizing roast, a dead roast, or explosion roast by controlling conditions in the same apparatus.

I prefer to use a very refractory heat-interchanger hearth, on which the roasting action takes place, since it must be resistant both to oxidizing and reducing effects on the heating flame, and also to the action of acid and basic fluxes derived from the ores themselves. For this purpose hearths of various shape may be employed, such as an annular disc, truncated cone, etc., but I preferably employ as shown in sectional view at 10 in Figure 1 a revolving cylinder or drum as the heat interchanger. This consists of a highly refractory drum shell of fire clay or of other similar material suitably supported upon the shaft 12. The surface of this drum is coated with a layer 11 of highly resistant basic refractory such as magnesium-ferrite, zirconium-oxide, etc. The drum is then fired at a temperature exceeding that to which it will be subjected when placed in use.

When assembled the drum is mounted upon a hollow shaft 12 in order to water cool the bearings 14 which support the shaft at its ends as shown in end elevation of the furnace in Fig. 3. These bearings are supported upon the extended base structure 15 of the furnace which is suitably framed and lined with fire brick, and contains the heat retaining enclosure of the combustion chamber 16. The superstructure 17 of the furnace is also suitably framed and contains the fire brick lined enclosure 18 for the upper part of the drum 10, also the flue 19, and the feed hopper 20. This superstructure 17 is supported upon the base structure 15 in such a way that it is movable thereon as by rotating it upon the hinges 22, or by other suitable means. When tilted backwards as shown by the broken lines in Fig. 1 the roasting drum 10 can then be mounted on the base structure 15 when assembling the furnace or can be removed therefrom when necessary.

Both the base structure 15 and the superstructure 17 contain projecting portions of their walls as at 24 and 25 which act as deflectors of the blast gases. These approach the roasting drum to within a small clearance, in order that the hot gases shall only heat one side of it by their direct contact. The remaining portion or side of the drum a little more than one half its circumference, on which side the ore to be heat-treated is fed, is thus shielded from contact with the products of combustion of the gases. When the furnace is in operation the drum 10 is revolved in the direction shown by the arrow by means of a motor 26 mounted on the base structure 15. This motor may also drive the vibrating tray 27 of the feed hopper 20 as by means of eccentrics 28 and thus deliver the thin sheet of ore to be roasted, directly upon the upper part of the roasting drum 10 through a slot opening 29 in the brick lining 18 of the furnace superstructure.

The heat for the roasting operation may be conveniently obtained by means of oil such as from an oil burner as shown at 30 in Figs. 1 and 2. Other kinds of fuel, such as natural gas or powdered fuel may however, also be employed where more readily available. The burner 30 as shown in Fig. 1 and in plan view in Fig. 2 is placed in front of an opening in the rear of the basestructure of the furnace and at a sufficient distance from the deflecting bridge wall 24 of the roasting drum so that the intervening brick lined space may act as a heat reservoir for the blast gases which are delivered in direct contact with the roasting drum. The oil may be supplied from a suitable storage tank 32 under gravity pressure, or through a pressure pump. It is then passed through a suitable strainer 33 and a regulating valve 34 to the burner 30. The pressure of the air required to atomize the oil and to control the temperature of the flame may be obtained by means of a pressure air blower 35 operated by a high speed motor as shown in Fig. 2. With proper adjustment of the oil supply and air pressure the temperature of the roasting drum can then be raised to that of perfect combustion of the gases which is about 2600° F. By reducing the oil supply and the air pressure as well as by allowing access of cold air directly to the furnace through the openings 37, Fig. 2, at the sides of the oil burner, the temperature of the gases can be greatly reduced so that of the roasting drum will not exceed the temperature of a dull red heat, or about 800° F. The flue 19 of the furnace is provided with a series of heater-tubes of refractory material as shown at 38 in the illustrations. By connecting the outlet of these tubes to the air supply of the oil burner, it is thus possible to preheat the blast and thus raise the temperature of the roasting drum to about 3000° F.

The operation of the furnace as clearly shown in Fig. 1 consists in rotating the roasting hearth in the direction shown by the arrow, and then raising the temperature of the hearth to the desired degree, by means of the blast of the burning gases directed against its side by regulating the oil supply and the air pressure at the oil burner 30. The ore is then fed from the hopper 20, to the vibrating tray 27, in a thin sheet upon the previously heated surface of the roasting hearth 10 through the slot opening 29, in the bridge wall of the superstructure. Upon touching the drum surface the temperature of the ore particles is instantly raised to that of the drum surface by contact absorption, or heat interchange owing to their small size. The speed of the drum is preferably regulated so that the centrifugal force developed is greater than the weight of the individual particles. They are therefore discharged from the drum surface and strike the refractory deflecting plate 39 from which they are guided in their descent against the water cooled surface 40 to the water-cooled screw conveyor 41. They are then discharged from the roasting furnace in the desired roasted condition. The heat which is abstracted from the drum surface by the ore in contact with it on one side, is continuously restored to it by flame contact on its opposite side.

With this new type of furance it is possible to give iron pyrites, chalcopyrite and other sulphides combined with iron a magnetizing roast by distilling off part of their combined sulphur, and then chilling them quickly so as to retain them in the form of artificial pyrrhotite. They thus become magnetizable and are amenable to magnetic separation in further ore dressing treatment. In this roasting operation the volatilized sulphur and some $SO_2$ gas may pass out of the side ports of the combustion chamber and the connecting ducts 42 to the main flue 19 of the furnace, where they are removed by the draft. The temperature of the roasting drum for this type of roast is that of a dull red heat or about 800° F. To avoid over roasting the ore is discharged into a neutral atmosphere and then chilled quickly. For this purpose the air inlet port 44 of the combustion chamber is closed. Since air at normal pressure contains 79 volumes of nitrogen and 21 volumes of oxygen, by thus preventing access of air, the accumulation of sulphur and $SO_2$ gas goes on, and when it has amounted to 9 per cent by volume further roasting and oxidizing of the iron present then automatically stops. In roasting certain copper and zinc ores it is possible to give such ores a sulphatizing roast by increasing the temperature of the roasting drum somewhat and also admitting a certain amount of air through the port 44.

For those ores which require a dead roast the temperature of the roasting drum is raised much higher and access of air to the roasting chamber is given by opening the port 44 to its full extent. In this way the increased speed of the heat reaction permits complete oxidation of the ore in obtaining a dead roast. In some cases however, the size of the roasting chamber may also be made greater than that shown in Fig. 1, so that the time interval to complete the reaction may be increased.

For an explosion roast the highest attainable heat, about 3000° F., is given the roasting-drum by preheating the air blast of the oil burner and by closing the air inlet port 44. The object here is to release those elements of an ore which are volatilizable, such as the sulphur atom in $FeS_2$ etc. so instantaneously that an explosion or shattering effect is exerted upon the ore particles themselves. A neutral atmosphere in the roasting chamber is desirable since the removal of the sulphur of the ore is not the object here as in dead-roasting an ore. The explosion roast may be found especially desirable for certain ores in which low gold and silver values are intimately associated with sulphide minerals. The shattering effect of the roast on these ores render such gold ores more amenable to recovery by cyanidation and the silver ores by flotation. Other applications of this invention will suggest themselves to those familiar with the art, in beneficiating additional ores and minerals within the wide range of temperature control in roasting and heat treating them thus made available.

In my invention the roasting effect is not limited to that obtained from various fuels nor from the sulphur which may be contained in the ores themselves, as in the case of the various rabble type of furnaces, flash roasters or those in which the ore is roasted inside an inclined cylinder. In such furnaces heat is absorbed mainly by contact with burning gases. For the most part they have been employed in roasting ores in a fairly coarse condition. Here the time interval required to complete the roasting operation is quite considerable. My furnace on the other hand is best adapted to the roasting of finely crushed ores, and the heat transfer by contact absorption from a preheated portion of a solid hearth is almost instantaneous. Moreover since the roasting is done in a separate chamber, or one shielded from the combustion chamber, and the ore is therefore out of contact with the combustion gases, it is possible to roast ore-slimes without dust losses. By my invention a wide range of temperature control of the refractory drum surface is readily obtained for the reason that although the temperature of perfect combustion of the oil at the burner 30 is 2600° F., yet the volume of gas at this temperature can be so proportioned with cold air from the inlet ports 37, that the temperature of the drum surface itself can be reduced to about 800° F. This is equivalent to that of a singeing or magnetizing roast. By closing the inlet ports 37 and by preheating the air to the oil burner 30, as already explained, the temperature of the drum surface can be raised to about 3000° F. or above that of the products of combustion of the oil fuel when using cold air. It is to be understood, however, that modifications and variations may be made to my apparatus within the scope and spirit of my invention and while I have disclosed a preferred form of embodiment of my invention I intend to include all such variations as come within the scope and spirit of the disclosure herein and of the claims appended hereinafter.

I claim:

1. The method of explosion roasting of finely divided ores which contain volatilizable constituents, which consists in continuously heating a revolving member composed of highly refractory material to a temperature above the ignition point of said volatile ore constituents by directing a blast of burning gases against one side of said rotating member and feeding said ores upon the heated portion thereof, shielding said heated portion during roasting from the products of combustion of said gases and imparting the degree of heat required for said explosion effect.

2. Apparatus for roasting ores comprising an enclosed heat-generating structure, a roasting drum supported in said structure, said drum having a refractory surface, a removable framed superstructure enclosing said drum, said superstructure having a flue and feed hopper, means for revolving said drum, means for regulating the degree of heat applied to said drum, means for feeding the ore upon a portion of said drum surface, and means to shield said portion of the drum from the heat generating structure.

3. Apparatus for roasting ores comprising an enclosed heat-generating structure, a roasting drum supported in said structure, said drum having a refractory surface, a removable framed superstructure containing a drum enclosure, flue and feed hopper, means for revolving said drum, means for regulating the degree of heat applied to said drum, means for feeding the ore upon a shielded portion of said drum surface and means for discharging the roasted ore into a non-reducing atmosphere.

4. A furnace comprising an enclosed heat-generating structure, a roasting drum provided with a refractory surface, supported in said structure, a removable framed superstructure containing a drum enclosure, flue and feed hopper, means for revolving said drum, means for raising the temperature of said drum surface to a white heat by preheating the air blast of the flame applied to said drum, means for feeding the ore upon a portion of said drum surface shielded from said blast, and means for discharging the roasted ore into a non-reducing atmosphere.

5. A furnace for roasting ores having a combustion chamber, a roasting chamber and hearth, said hearth being movable through said chambers, means to maintain the roasting chamber free of gaseous interchange with the combustion chamber, means to feed ore particles onto said hearth, means to control the temperature and gaseous condition of said hearth for the desired type of roasting, and means to discharge the roasted ore particles from said roasting chamber.

6. A furnace for roasting ores having a combustion chamber, a refractory drum hearth, a roasting chamber and means to separate the combustion chamber from the roasting chamber to prevent gaseous interchange therebetween, means to rotate the drum through both chambers and means to feed ore particles in an attenuated stream to said drum.

7. A furnace for roasting ores having a combustion chamber, a rotatable refractory hearth movable through the combustion chamber and heated therein, a roasting chamber, means to separate the combustion chamber from the roasting chamber to prevent gaseous interchange therebetween, means to rotate the hearth to expose the heated surface thereof, in the roasting chamber, means to feed ore particles to the heated surface of said hearth, and a water cooled wall in the combustion chamber adjacent the point of discharge of the ore particles whereby said ore particles may be rapidly cooled.

8. A furnace for roasting ores whereby said ore may be given a magnetizing roast, sulphatizing roast, dead roast or explosion roast, which comprises a combustion chamber, controllable means to heat said combustion chamber, a rotatable refractory hearth movable through and heated in said combustion chamber, means to control the rotation of said hearth, a roasting chamber, said hearth extending into and being movable through a portion of the roasting chamber, means to separate said roasting chamber from said combustion chamber to prevent gaseous interchange, means to control the gas condition of said roasting chamber, means to feed ore particles to said rotatable hearth and means to discharge ore particles from said roasting chamber.

9. The method of roasting finely divided ores and minerals by contact heat absorption from a refractory hearth moving in a closed circuit through a combustion chamber and a roasting chamber, shielded from each other, which consists in heating that portion of said hearth which is passing through the combustion chamber, and feeding said material upon and discharging it from that portion of the hearth which is passing through the roasting chamber.

10. A furnace for roasting ores as defined in claim 5 wherein the feed means and hearth are arranged to cause the ore particles to contact momentarily with the hearth and then to be deflected therefrom.

CLARENCE Q. PAYNE.